United States Patent [19]

Ernst

[11] 4,227,668
[45] Oct. 14, 1980

[54] HANGER MEMBER

[75] Inventor: Donald J. Ernst, Milwaukee, Wis.

[73] Assignee: Rheem Manufacturing Company, Apex, N.C.

[21] Appl. No.: 933,859

[22] Filed: Aug. 15, 1978

Related U.S. Application Data

[63] Continuation of Ser. No. 739,939, Nov. 8, 1976, abandoned.

[51] Int. Cl.² .............................................. B42F 13/00
[52] U.S. Cl. ..................................... 248/317; 17/44.2; 24/16 PB
[58] Field of Search ............... 248/317, 318, 359, 360; 17/44.2; 24/16 PB, 17 R, 17 A, 17 AP, 30.5 R, 30.5 P, 30.5 S; D9/252

[56] References Cited

U.S. PATENT DOCUMENTS

| | | | |
|---|---|---|---|
| 2,972,791 | 2/1961 | Kelem | 24/30.5 W |
| 3,007,666 | 11/1961 | Hamel | 248/317 |
| 3,224,054 | 12/1965 | Lige | 24/16 PB |
| 3,289,983 | 12/1966 | Menneroahl | 248/317 X |
| 3,556,575 | 1/1971 | Farkas | 292/307 R |
| 3,931,948 | 1/1976 | Mason | 248/318 |
| 3,943,606 | 3/1976 | Ernst | 17/44.2 X |
| 4,044,450 | 8/1977 | Raudys | 17/44.2 X |

FOREIGN PATENT DOCUMENTS 217864 12/1967 Sweden ................................... 17/44.2
381603 10/1964 Switzerland .......................... 24/16 PB

*Primary Examiner*—J. Franklin Foss
*Attorney, Agent, or Firm*—Allegretti, Newitt, Witcoff & McAndrews

[57] ABSTRACT

An improved thermoplastic hanger member for hanging sausage casings and method of clipping the same to such casings by high speed automatic clipping machines. The member is a compact, one-piece generally elongate mylar strip device comprising integral slit means and serrations therein, said member being readily adaptable for anchoring to a sausage casing by clipping a metal fastener about the casing and one of said serrations.

6 Claims, 8 Drawing Figures

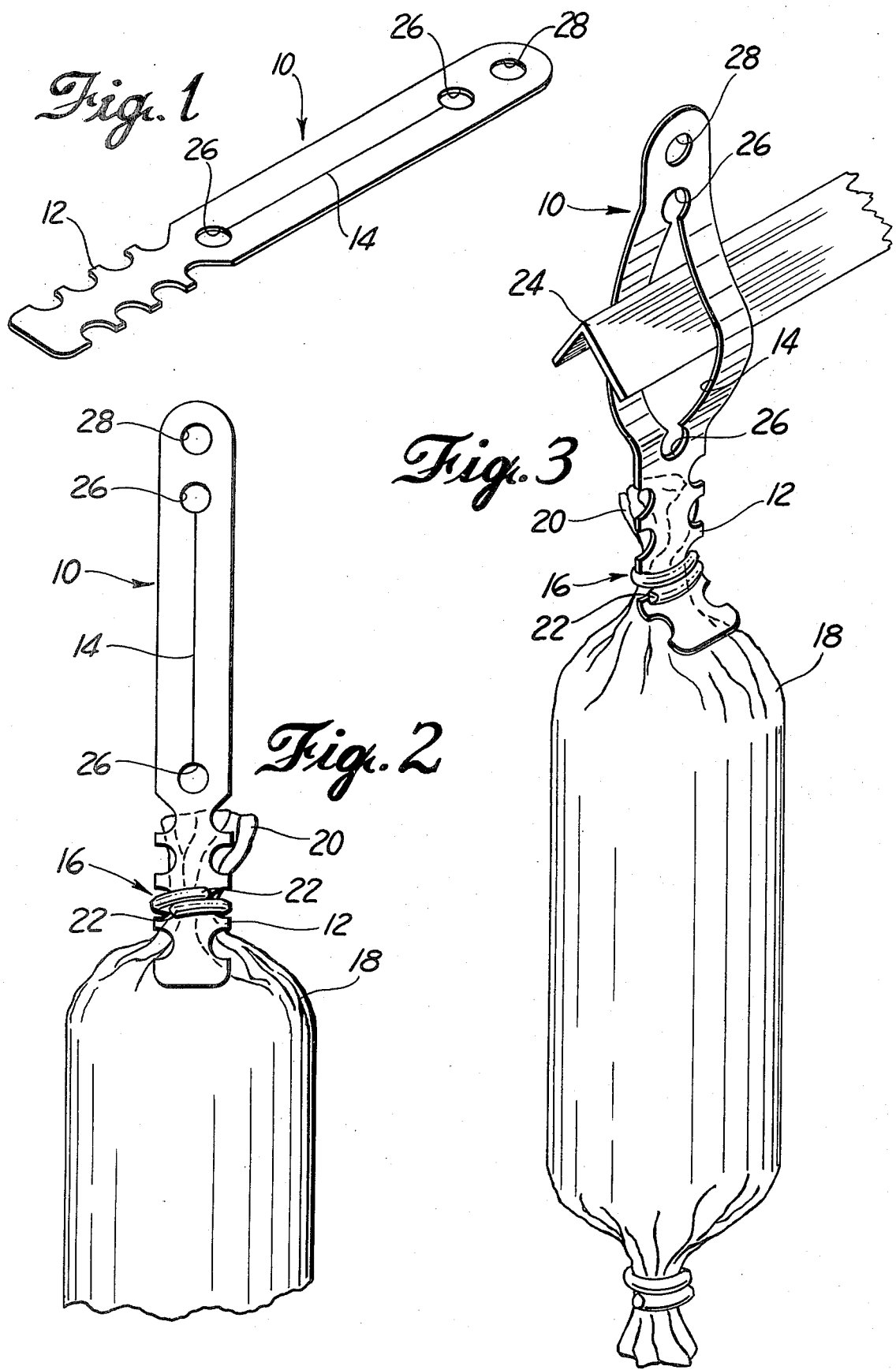

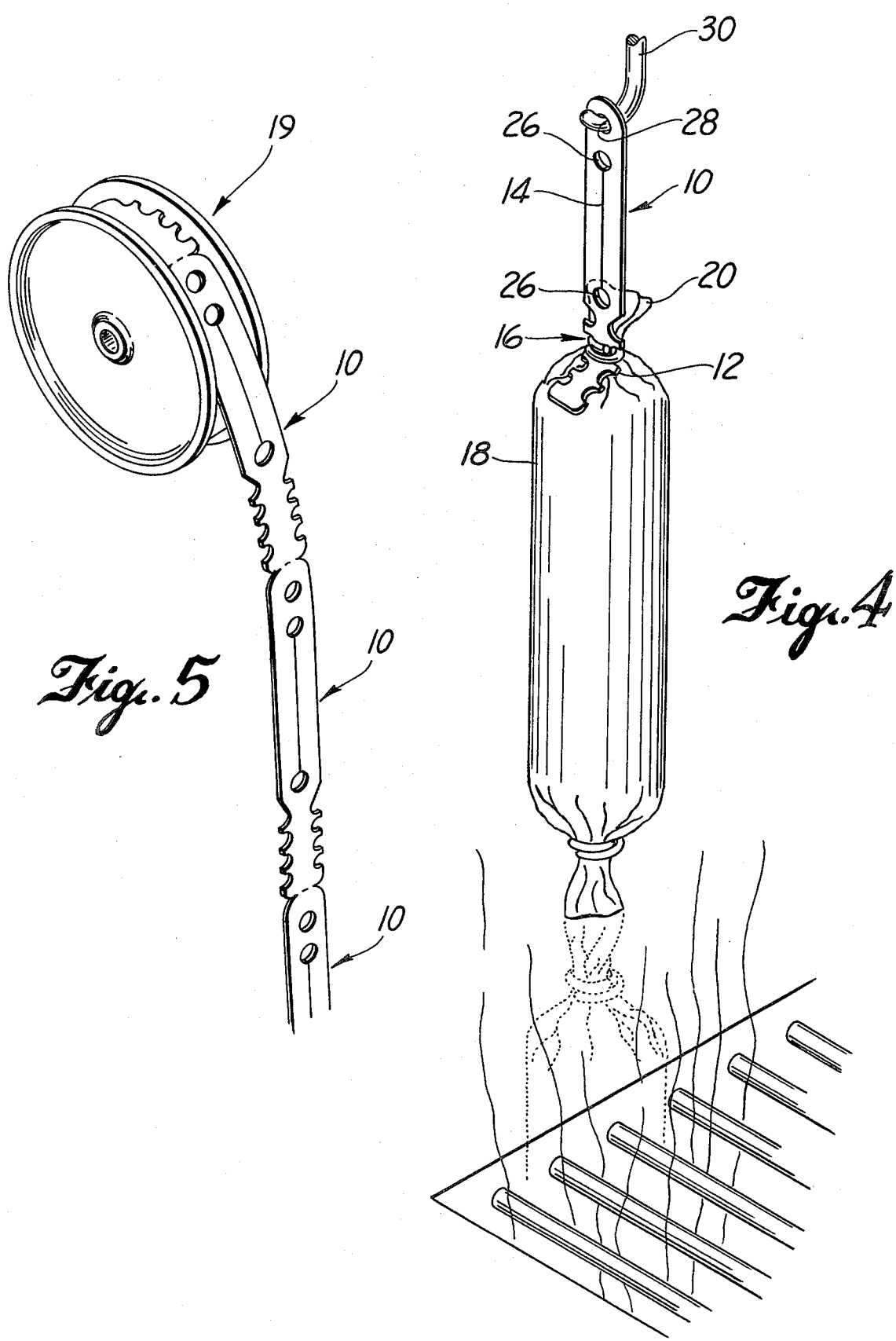

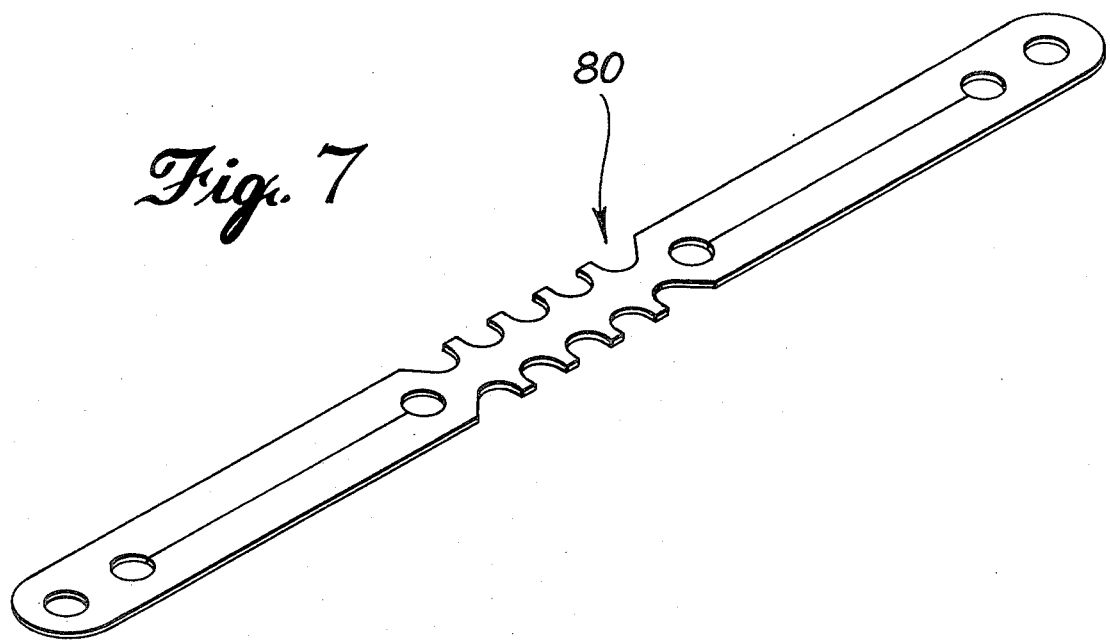
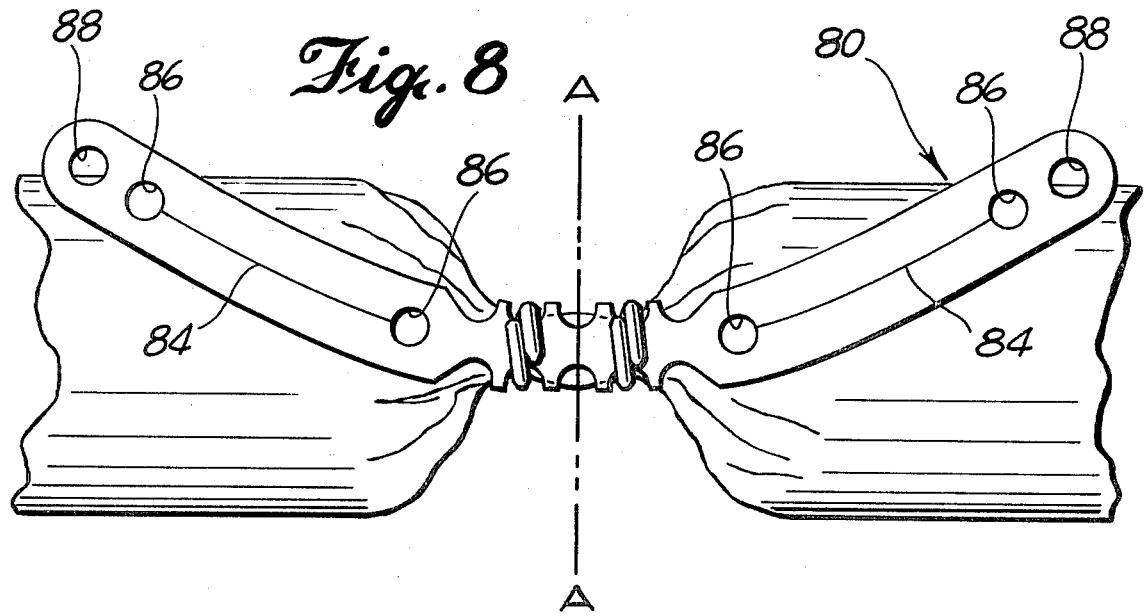

HANGER MEMBER

This is a continuation of application Ser. No. 739,939, filed Nov. 8, 1976 now abandoned.

BACKGROUND OF THE INVENTION

1. Field of the Invention

This invention relates to processing of sausage and more particulary to improvements in sausage hanger members and their adaptation to high speed automatic clipping machinery.

2. Discription of Prior Art

The processing of link sausage generally requires hand draping or looping of links about a hook or rack device during smoking and other preparatory stages of processing. Thereafter it is stored, packaged and otherwise conditioned and prepared for marketing to customers.

A typical hanger member uitlized for these purposes is more fully shown and described in U.S. Pat. No. 3,943,606 dated Mar. 16, 1976 and U.S. Pat. No. D240,211 dated June 8, 1976, both for Hanger Members issued to Donald J. Ernst of Milwaukee, Wis. Another is shown in U.S. Pat. No. 3,565,640 dated Feb. 23, 1971 to J. Dohlmann for a Strap For Hanging Sausages.

Hanger Members of this type as well as those other members which have been available heretofore generally are not adaptable for automatic machine application to sausage and like-product casings because the configuration of such hangers is either too large or awkward to be mechanically handled in the confined clipping section of automatic machinery. Consequently, the existing method for attaching a hanger member to casing involves laying the hanger member by hand on the casing and then manually feeding the combination to a clipping device where the member is secured to the casing by a metal clip. Such manual operation generally defeats the advantages of high speed production machinery in that the clipping operation cannot keep pace with the sausage filling operation. This deficiency is sometimes alleviated by utilizing large numbers of laborers to manually clip casings as needed.

SUMMARY OF THE INVENTION

The general object of the present invention is to provide an improved method and apparatus for processing sausage links which circumvent the problems heretofore noted.

More specifically, it is an object to provide an improved method and apparatus for processing sausage links which is capable of manufacture at low cost, is of one-piece construction and so designed to be readily and easily attached in mass production of sausage links.

It is also a specific object of the present invention to provide an improved Hanger Member which is adapted to be attached to casings and like-products by high speed automatic clipping machinery.

An additional object of the present invention is to provide a Hanger Member which requires no manual labor to combine such member to a sausage casing.

DETAILED DESCRIPTION OF THE DRAWINGS

Describing the present invention, reference will be made to the accompanying drawings forming a part of the instant invention wherein:

FIG. 1 is a perspective view of the one-piece hanger member constructed in accordance with the instant invention.

FIG. 2 is a plan view of the instant invention illustrating a method of rigidly attaching said member to a sausage casing or like-product.

FIG. 3 is a perspective view of the hanger member of the instant invention illustrating a sausage link hung by said member on a smokehouse rack.

FIG. 4 is a perspective view of a smokehouse, broken away, illustrating the use of the hanger member of the instant invention to hang a sausage link above an open grating in a smokehouse.

FIG. 5 is a perspective view illustrating a continuous roll of Hanger Members utilized in high speed automatic clipping machinery.

FIG. 7 is a perspective view of an alternate embodiment of the Hanger Member of the instant invention.

FIG. 8 is a planned view illustrating a method of rigidly attaching the Hanger Member of FIG. 7 to the shank portion of the casing.

DETAILED DESCRIPTION OF THE INVENTION

Figure 6:
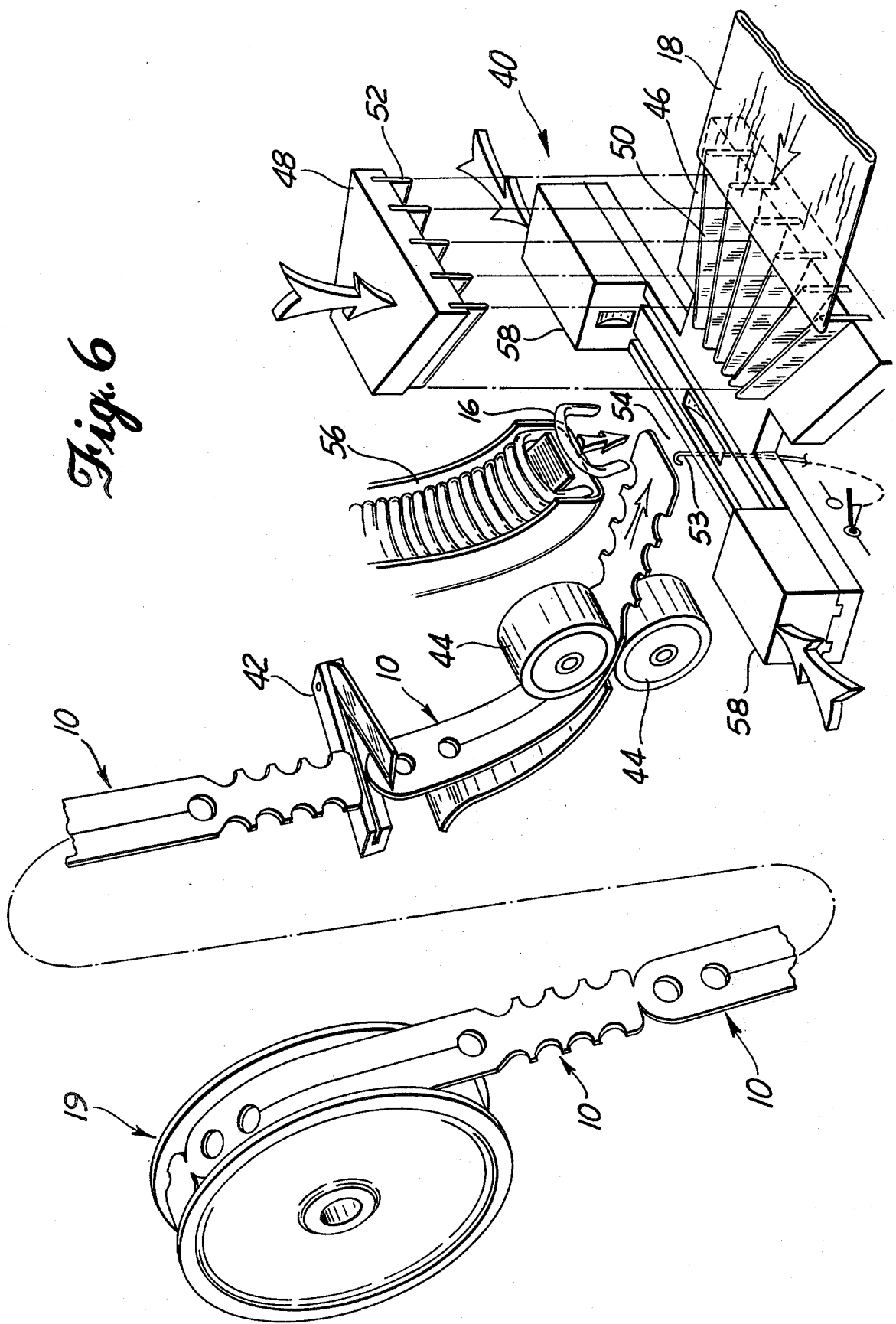
FIG. 6 is a perspective view illustrating the threading of the Hanger Member roll of FIG. 5 in an automatic clipping machinery device for threading onto a sausage casing to be processed by such machinery.

Referring to FIGS. 1 and 2 of the drawings, there is shown a Hanger Member generally indicated at 10 having peripheral cutouts forming a plurality of ridges, serrations or anchor means 12 at one end thereof and a slit 14 confined adjacent thereto at the opposite end of such member 10 in accordance with the instant invention.

Hanger Member 10 is preferably constructed of a thermoplastic recyclable material such as nylon or polypropylene or mylar having flexible characteristics to facilitate attachment by clip 16 to the casing 18 as shown in FIGS. 2, 3 and 4.

Hanger Member 10 is preferably elongate in configuration and can be manufactured in a multicavity die of an injection molding process. Member 10 may also be produced from flat stock material which is die cut or sheared to the configuration shown in FIG. 1. It is insignificant if the peripheral edges obtained in either method are irregular as the uses intended for member 10 do not require precision appearance. Great economies in producting Member 10 can be realized by feeding a continuous roll 19 of mylar tape or like material in roll form through a high speed shearing operation to manufacture a continuous roll of hanging members as shown in FIG. 5.

Hanger Member 10 should be sufficiently pliable to readily permit positioning thereof immediately adjacent to the end or shank portion 20 of casing 18 for clipping thereto by clip 16 as shown in FIGS. 2 and 3. Clip 16 is oriented relative to ridges 12 so that upon completion of clipping, end portions 22 of clip 16 are bent to the underside of ridges 12 and casing 18 as shown in FIGS. 2 and 3. This ensures that clip 16 rests securely against ridges 12 and around shank portion 20 thus minimizing the risk of the sausage casing pulling therepast and falling onto the grates or floors of the processing areas where they may be destroyed, contaminated or otherwise rendered unsalable. Member 10 must also be sufficiently pliable to permit insertion of a rack through slit 14 as shown in FIG. 3 during processing operation. In this connection, it is to be noted that generally circular cutouts 26 terminate the length of slit 14 as shown in FIGS. 1 and 2 to prevent slit 14 from propagating and tearing throughout the remaining length of Member 10. In addition Hanger Member 10 contains a generally circular cutout 28 for hanging the Member 10 on a hook device 30 as shown in FIGS. 1 and 4, however, such hook device may also be connected to slit 14 or cutouts 26 as well. It is to be further noted slit 14 can also have the configuration of a hole or an elongated opening and still perform the function contemplated hereunder.

The mylar tape roll 19 shown in FIG. 5 comprises a continuous roll of Hanger Members 10 which is readily adaptable for insertion in a high speed mechanical clipping device or machine 40 used in connection with sausage processing machinery shown schematically in FIG. 6. It is to be noted that the space in which Member 10 is clipped to the casing 18 is confined and limited yet the strip configuration of the roll 19 readily permits access for Member 10 to be adapted for use in machine 40 for automatically inserting therein onto casing 18 and attached thereto by clip 16. The utilization of a continuous roll of tape 19 in machine 40 requires cutting individual Members 10 from the roll 19 with a separation means or cutting member 42 and a feeding device such as guide rollers 44 illustrated schematically in FIG. 6. The cutting member 42 may be synchronized to break, separate or cut a member 10 from roll 19 either prior to, simultaneously with, or after clip 16 is secured about member 10 and casing 18.

In operation, roll 19 is advanced in machine 40, cut and clipped to the casing in the following manner. Casing 18 is advanced either manually or automatically between die plates 46, 48 having integral pleating members 50, 52, respectively. Casing 18 engages a microswitch element 53 thereby sequentially energizing die plates 46, 48, feeding device 44, and lastly, the clipping operation. Plates 46, 48 cooperate to cause members 50, 52 to pleat or uniformly neck down casing 18 at its extreme end portion in the clipping area designated at 54. Feeding device 44 then advances tape 19 or member 10 into area 54 in a clipping position above casing 18. It is to be noted feeding device 44 can be setup to feed either tape 19 or member 10 in the aforementioned clipping position prior to pleating casing 18. Similarly cutting member 42 can be set to detach member 10 from tape 19 prior to positioning above casing 18 or during or after the clipping operation.

The clipping operation is sequentially activated by element 53 after member 10 and casing 18 are in a clipping position within area 54. Clip 16 is metered one at a time from trough 56 onto member 10 and the necked down portion of casing 18 by feed means commonly used in industry. Once clip 16 is properly positioned, clipping jaws 58 are energized to secure the clip about member 10 and casing 18 resulting in a product shown in FIGS. 2-4.

The pleating and clipping apparatus may be of the type commonly available which are manufactured by Tipper-Tie Division of Rheem Manufacturing Company, Apex, New Jersey. The roll feeding and separating devices are constructed from commercially available mechanical components and fabricated feeding apparatus components which accomodate roll 19 and/or member 10 configuration.

An alternate embodiment of hanger member 10 is designated as 80 in FIGS. 7 and 8 which utilize like reference characters for like parts hereinbefore described. As can readily be recognized, either end portion of member 80 is identical to member 10 by bisecting member 80 along section A—A in FIG. 8. Member 80 is used primarily for hanging individual open-ended empty sausage casings which are first secured to hanger members 80 for reasons of economy prior to filling. After the hanger member 80 is secured, the casing is filled and tied for sealing sausage contents and is then finally hung on a rack such as 24 in FIG. 3 through slit 84 or by hook device 90 through generally circular cutouts 86 and 88.

Thus, it will be apparent to those skilled in the art that the present invention provides a substantial improvement over prior art devices in that its unique configuration lends itself to economies of high speed automatic application by machinery to sausage casings and like products and consequently substantial savings to sausage processing operations can be achieved. While the hanging member hereinbefore described is effectively adapted to fulfill the object stated, it is to be understood that the invention is not intended to be confined to the particular preferred embodiment disclosed or for use solely with the type casing shown inasmuch as it is adaptable for use with other casings utilized for sealing many other types of products and is susceptible of various modifications without departing from the scope of the appended claims.

I claim:

1. A plurality of substantially identical hanger members, each member adapted to be attached by clip means to a product filled casing or the like to permit hanging of the product, each of said members comprising, in combination:

a length of generally flat, flexible tape material, said material including parallel sides, opposite ends, a flat surface, and a slit in the flat surface through the material, said slit extending from adjacent one end of the length of tape material toward the opposite end, said slit terminating with opposite slit ends, each end connected with a circular cutout in the tape material to prevent propagation of the slit in the tape material, said slit defining means for forming a loop upon separating the sides of the slit by flexing of the tape material on opposite sides of the slit in opposite directions to permit a hanger member support to be projected through the formed loop;

a plurality of spaced ridges formed at the opposite end of the tape material generally beyond the slit formed by removal of portions of the tape material inwardly from the parallel sides to define ridges extending, said ridges being in opposed relation on opposite sides of the tape material and extending generally transverse to the direction of the slit whereby a clip can be fitted about the tape material adjacent the ridges, said ridges being cooperative with the clip to retain the hanger member attached to a casing; and each of said members being formed integrally in a single elongate tape with the slit end of each member adjacent the ridge formed end of the next adjacent member, each member being of substantially uniform length.

2. The improved hanger member of claim 1 wherein said elongate tape is wound on a spool.

3. The improved hanger member of claim 1 including an additional circular cutout for receipt of a hook, said additional circular cut out being adjacent said one end of the length of the tape material.

4. The improved hanger member of claim 1 including at least two ridges on each side of the tape.

5. The improved hanger member of claim 1 including more than two ridges on each side of the tape.

6. The improved hanger member of claim 1 wherein said tape material comprises mylar.

* * * * *